Patented Aug. 13, 1946

2,405,835

UNITED STATES PATENT OFFICE 2,405,835

ACID DISAZO DYESTUFFS AND A PROCESS FOR THEIR MANUFACTURE

Adolf Krebser, Riehen, near Basel, Switzerland, assignor to J. R. Geigy A. G., Basel, Switzerland No Drawing. Application June 15, 1942, Serial No. 447,147. In Switzerland July 29, 1941

1 Claim. (Cl. 260—178)

It has been found that valuable red disazo dyestuffs are obtained by tetrazotising diamino diphenyl sulphones or diamino diphenyl sulfoxides which are free from sulfonic and carboxylic acid groups and derivatives thereof, such as the alkyl, alkoxy or halogen derivatives, and combining the tetrazo compounds in an acid solution with 2 molecules of 2-amino-8-hydroxynaphthalene-6-sulfonic acid.

The new dyestuffs possess a surprising good light fastness and a remarkable sea-water fastness.

The present invention is illustrated, but not limited, by the following examples:

Example 1

27.6 parts of 4:4'-dimethyl-3:3'-diaminodiphenyl sulfone are tetrazotised in the usual manner. The tetrazonium solution is then coupled with 47.8 parts of 2-amino-8-hydroxynaphthalene-6-sulfonic acid which has been dissolved neutrally in 200 parts of water and the required quantity of sodium carbonate and again precipitated with hydrochloric acid by acidifying until a Congo-acid reaction has been reached. The coupling takes place slowly, but may be accelerated by heating and adding sodium acetate. When the dyestuff formation is completed, the whole is made neutral to Congo by means of a solution of sodium carbonate, then filtered and dried.

The dyestuff which constitutes a dark red powder dissolves in water with a yellowish red coloration, in sulfuric acid with a violet coloration and dyes wool from an acid bath in light-fast, bluish-red shades.

According to the process described in the above example the following dyestuffs may be obtained:

| Example | Tetrazo compound from— | Coupling component | Shade of the acid wool dyeing |
|---|---|---|---|
| 2 | 4:4'-dimethoxy-3:3'-diaminodiphenylsulfone | 2-amino-8-hydroxynaphthalene-6-sulfonic acid | Red. |
| 3 | 4:4'-diaminodiphenylsulfoxide | do | Bluish-red. |
| 4 | 3:3'-diaminodiphenylsulfone | do | Yellowish-red. |
| 5 | 2:4'-dimethyl-3':5-diaminodiphenylsulfone | do | Bluish-red. |
| 6 | 4:4'-dichloro-2:2'-diaminodiphenylsulfone | do | Blue-red. |
| 7 | 3:3'-dimethyl-4:4'-diaminodiphenylsulfone | do | Red. |
| 8 | 3:3'-dimethyl-4:4'-diaminodiphenylsulfoxide | do | Do. |
| 9 | 4:4'-dimethyl-2:2'-diaminodiphenylsulfone | do | Blue-red. |
| 10 | 4:4'-diaminodiphenylsulfone | do | Bluish-red. |
| 11 | 4:4'-dichloro-3:3'-diaminodiphenylsulfone | do | Do. |

A preferred dyestuff according to the invention, and that to which the appended claim is particularly directed, is the dyestuff of Example 4.

What I claim is:

The acid disazo dyestuff having in the free state the following formula

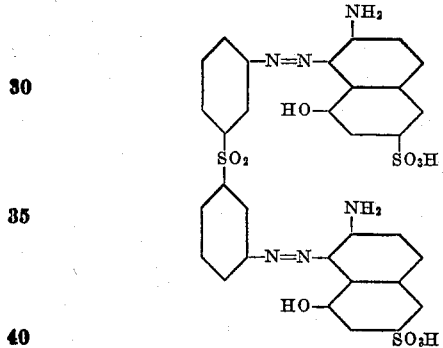

ADOLF KREBSER.